Dec. 2, 1969   R. P. NEWMAN   3,481,064
ICE FISHING APPARATUS
Filed March 21, 1968   3 Sheets-Sheet 2
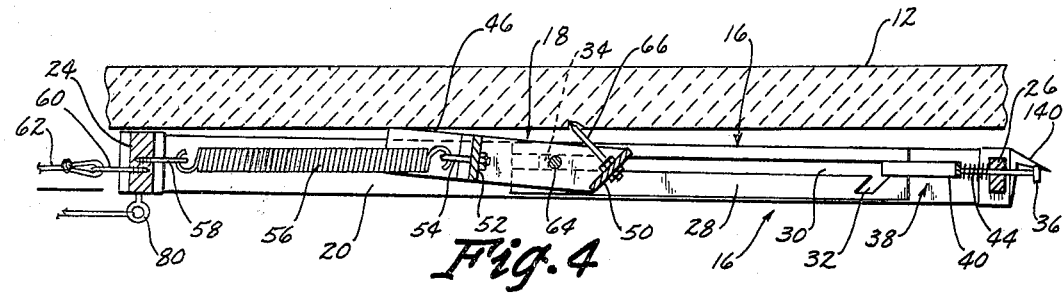
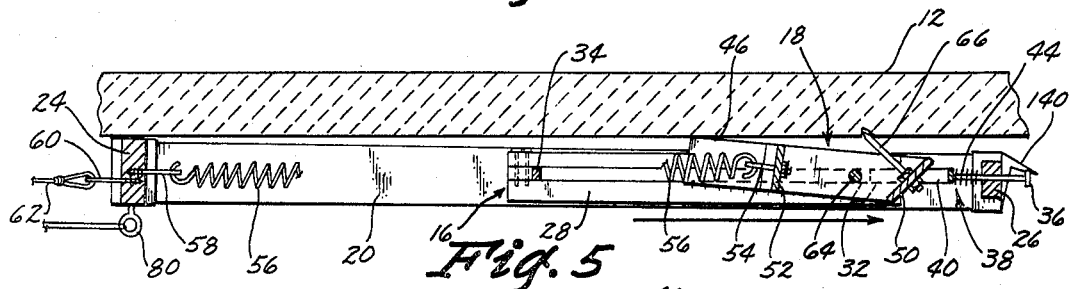
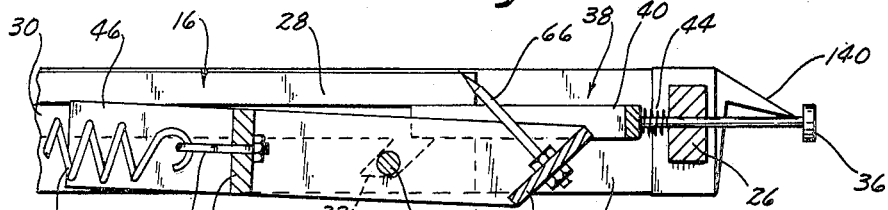
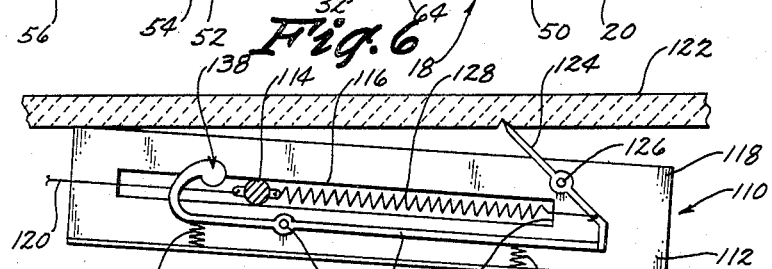
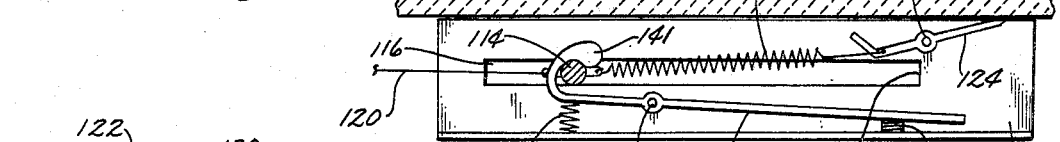
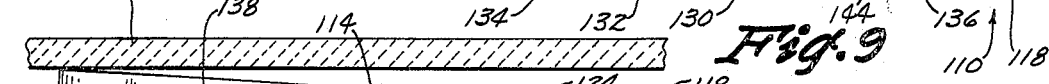
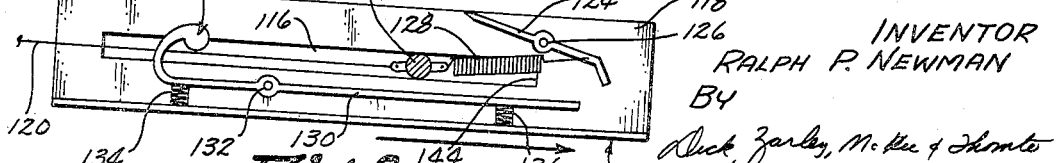
INVENTOR
RALPH P. NEWMAN
BY
ATTORNEYS Dec. 2, 1969   R. P. NEWMAN   3,481,064
ICE FISHING APPARATUS
Filed March 21, 1968   3 Sheets-Sheet 3

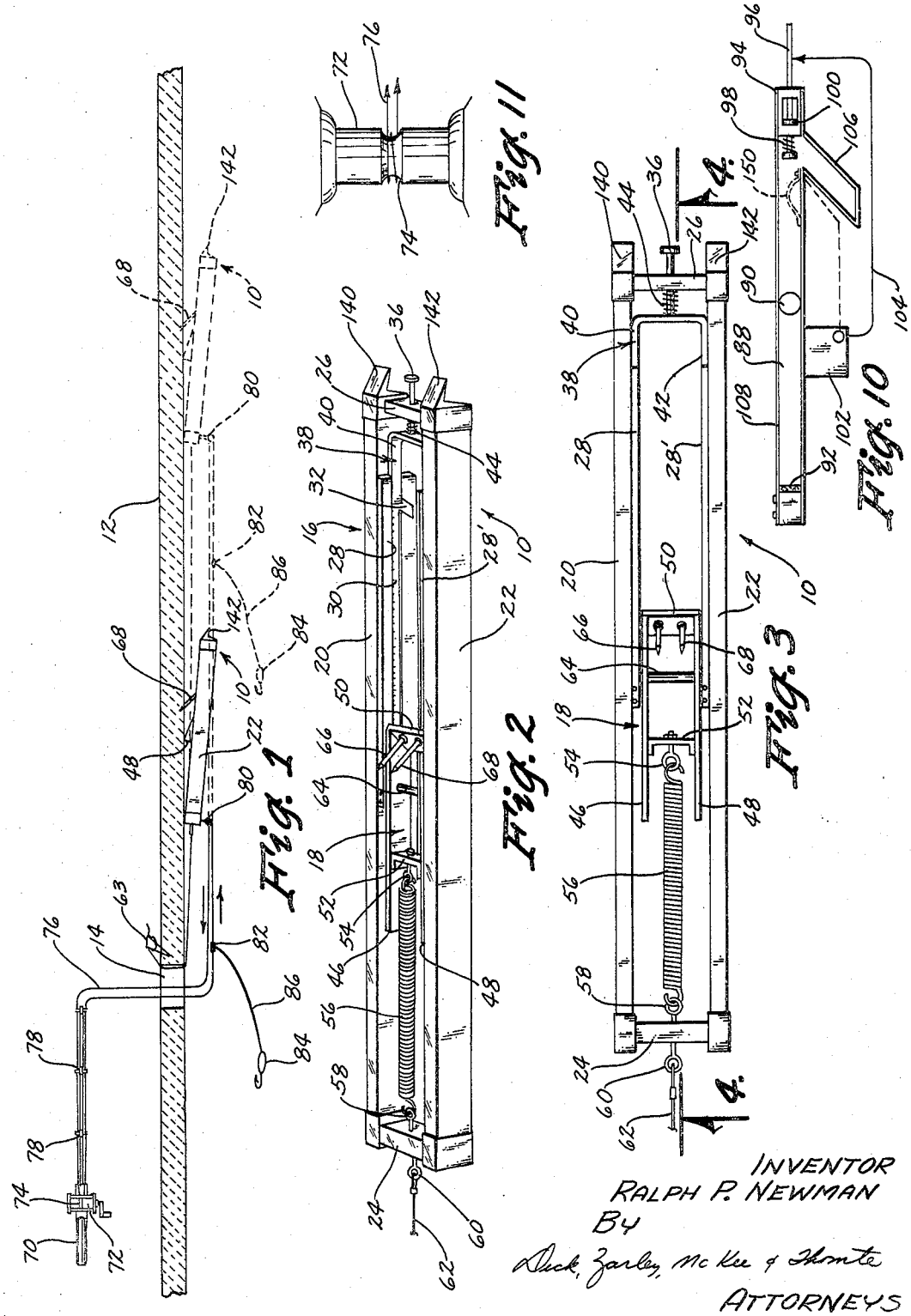

INVENTOR
RALPH P. NEWMAN
BY
Dick, Zarley, McKee & Thomte
ATTORNEYS

United States Patent Office 3,481,064
Patented Dec. 2, 1969

3,481,064
ICE FISHING APPARATUS
Ralph P. Newman, Minot, N. Dak., assignor to
Lottie Shipman, Granville, N. Dak.
Filed Mar. 21, 1968, Ser. No. 714,970
Int. Cl. A01k 91/02, 97/00
U.S. Cl. 43—4                    19 Claims

ABSTRACT OF THE DISCLOSURE

The apparatus includes a frame having a spiked anchor block slidably mounted thereon. A spring connected between the frame and block resists relative movement therebetween. A remotely controlled line connected to the frame serves to tension the spring when the spikes engage the ice. An endless fishing line is carried by the frame and a remote reel for moving fishhooks to selected positions therebetween. The anchor spikes have an inoperative position to permit the apparatus to be recovered and a signal permits location of the apparatus for recovery.

---

Ice fishing usually involves the lowering of at least one fishing line through an opening formed in the ice layer. Obviously, the fisherman is limited to the particular radius surrounding the hole bored in the ice. Commercial fishermen sometimes string a line beneath the ice and this line may carry a plurality of fish hooks or may carry a fishing net attached thereto. Presently, several holes must be bored through the ice on line with the direction of running the line or net and a "running pole" is then piked from hole to hole with prongs or the like and the pole carries the line wtih it. Obviously, the necessity of boring several holes in the ice together with the splicing of several boards together to form the "running pole" is extremely time consuming and tedious. It can also be appreciated that the commercial fisherman must transport the large amount of gear from fishing site to fishing site due to the large number of boards making up the "running pole."

Therefore, it is a principal object of this invention to provide an ice fishing apparatus which may be used for placing a fishing line beneath an ice layer on a body of water.

A further object of this invention is to provide an ice fishing apparatus which may be used to extend a fishing net beneath the ice.

A further object of this invention is to provide an ice fishing apparatus including means thereon for trolling and/or still fishing.

A further object of this invention is to provide an ice fishing apparatus which is easily transported from one site to another.

A further object of this invention is to provide an ice fishing apparatus which includes visual and/or signal means thereon to aid in the recovery thereof.

A further object of this invention is to provide an ice fishing apparatus which can be successively operated to propel the apparatus to a desired location remote of an opening formed in the ice layer.

A further object of this invention is to provide an ice fishing apparatus including an anchor block means thereon, the anchor block means being selectively deactivated so that the apparatus can be returned to the opening in the ice layer for recovery thereof.

A further object of this invention is to provide a "one man" military field device for remotely setting detecting devices, charges, or mines under ice on bodies of water potentially negotiable by an enemy.

A further object of this invention is to provide an ice fishing apparatus which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a side view of the apparatus positioned below a layer of ice which is shown in section, the broken lines indicating the movement of the apparatus from one position to another;

FIG. 2 is a perspective view of the apparatus;

FIG. 3 is a top view of the apparatus;

FIG. 4 is a sectional view as seen along line 4—4 of FIG. 3 which illustrates the anchor block means engaging the underside of the ice layer prior to rearward force being exerted on the frame means by the piking line;

FIG. 5 is a view similar to FIG. 4 and which illustrates the relationship of the anchor block means to the frame means after the frame means has been moved towards the opening in the ice layer by means of the piking line;

FIG. 6 is a fragmentary side sectional view of the apparatus illustrating the anchor block means in its inoperative position;

FIG. 7 is a longitudinal sectional view of a modified form of the appaartus;

FIG. 8 is a view similar to FIG. 7 with the relationship of the parts thereof being shown when the displacement force on the spring means has been suddenly released;

FIG. 9 is a longitudinal sectional view of the device of FIGS. 7 and 8 which illustrates the ice engaging means in an inoperative position;

FIG. 10 is a schematic view illustrating the signal means which may be included in the apparatus of FIGS. 1–5;

FIG. 11 is an elevational view of the unique reel arrangement which may be used in conjunction with the apparatus of FIG. 1.

Figure 12:
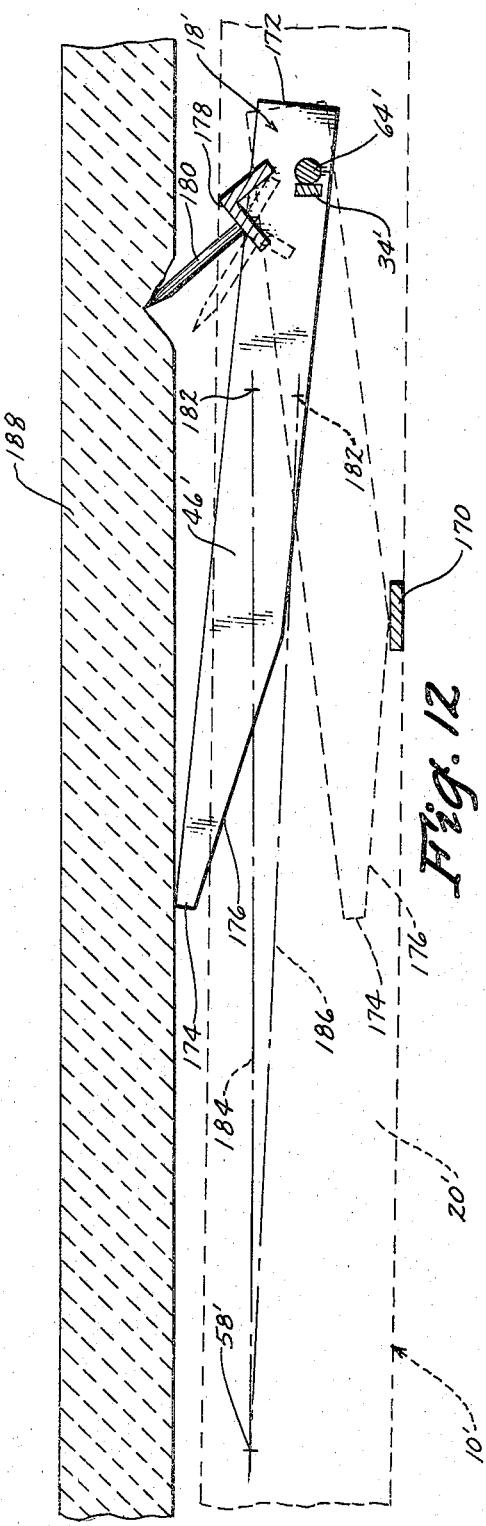
FIG. 12 is a fragmentary side view of a modified form of the apparatus with portions thereof cut away to more fully illustrate the invention.

The apparatus of this invention is generally designated by the reference numeral 10 and as seen in FIG. 1 is adapted to be utilized below a layer of ice generally designated by the reference numeral 12. The apparatus is placed beneath the ice 12 through a suitable opening 14 formed therein by boring or the like.

Apparatus 10 generally includes a frame means 16 and an anchor block means 18 slidably mounted thereon. Frame means 16 includes a pair of spaced apart pontoons 20 and 22 having rear and front clamps 24 and 26 secured to the rearward and forward ends thereof respectively and extending therebetween as illustrated in FIG. 2. A slide 28 is secured to the inside surface of pontoon 20 by any convenience means as illustrated in FIGS. 2 and 3 and has a channel 30 formed therein which extends longitudinally thereof. Slide 28 is provided with a slot 32 which communicates with channel 30 adjacent the forward end thereof and which extends downwardly and rearwardly therefrom as illustrated in FIG. 2. Slide 28 is provided with a stop 34 at the rearward end of channel 30 as illustrated in FIG. 4. Likewise, a slide 28' is secured to the inside surface of pontoon 22 which is identical to slide 28 and for that reason will not be described in detail.

A reset pull knob 36 slidably extends through front clamp 26 and has a U-shaped member 38 secured thereto and extending rearwardly therefrom. U-shaped member 38 includes a pair of legs 40 and 42 which are slidably received by the longitudinal channels formed in slides 28 and 28'. A spring means 44 embraces knob 36 between U-shaped member 38 and front clamp 26 and yieldably resists the forward movement of knob 36 and U-shaped member 38 with respect to the slides 28 and 28'.

Anchor block means 18 includes a pair of spaced apart block members 46 and 48 having an inclined support 50 secured to and extending between the forward ends thereof. A support 52 is secured to block members 46 and 48 forwardly of the rearward end thereof as best seen in FIG. 3. A spring ring 54 is secured to support 52 and extends rearwardly therefrom and has one end of a spring 56 detachably secured thereto. The other end of spring 56 is detachably secured to a spring ring 58 which is secured to rear clamp 24 and extends rearwardly therefrom. A pull ring 60 is secured to rear clamp 24 and extends rearwardly therefrom and has a piking rope 62 secured thereto which extends outwardly through opening 14. FIG. 1 illustrates rope 62 being fastened to a peg 63 which is driven into the ice 12. Block members 46 and 48 have a slide pin 64 extending therethrough, the outer ends of which are received by the channels formed in slides 28 and 28' respectively. Stop 34 limits the rearward movement of pin 64 with respect to the slides 28 and 28' while the rearward ends of U-shaped member 38 limits the forward movement of the slide pin 64 with respect to slides 28 and 28'. A pair of picks 66, 68 are detachably secured to inclined support 50 and extend upwardly and rearwardly therefrom as illustrated in the drawings.

The numeral 70 designates a fishing rod having a direct drive reel 72 without level wind. Reel 72 has a line drive notch 74 formed therein which extends therearound and which is adapted to receive a fishing line 76 thereon in the manner illustrated in FIG. 11. The rod 70 is provided with a plurality of double eyelets 78 through which the line 76 passes in the manner illustrated in FIG. 1. Line 76 is of the continuous type and extends through the opening 14 and is received by an eye bolt 80 which is secured to rear clamp 24. A three-way swivel 82 is secured to the fishing line 76 and has a fishing lure 84 secured thereto by means of a leader 86. Preferably, reel 72 should be constructed of a cork or other high friction material so that the rotation thereof will cause the fishing line 76 to be moved between the opening 14 and the eyelet 80.

As previously stated, FIG. 10 is a schematic illustration of a particular signal means which may be incorporated into the apparatus 10 to provide the apparatus with a signal means to aid in the location of the apparatus. The numeral 88 generally designates a channel which would be substitute for the channel 30 and a similar channel would be provided directly opposite channel 88 which would correspond to the channel on slide 28'. A slide pin 90 is slidably mounted and extends between the channels and is limited in its movement in one direction by stop 92. The numeral 94 designates a rod housing block having a push rod 96 slidably extending therethrough. Bumper spring 98 embraces push rod 96 rearwardly of housing block 94 and a stop nut 100 is provided on push rod 96 to limit the rearward movement of the push rod with respect to the rod housing block 94. Push rod 96 is operatively connected to a reset pull knob corresponding to reset pull knob 36 in apparatus 10. A standard battery buzzer 102 is electrically connected to push rod 96 by means of wire 104. A lock slot 106 is in communication with channel 88 and extends downwardly and rearwardly therefrom as illustrated in FIG. 10. When slide pin 90 contacts push rod 96, the buzzer circuit is completed through slide 108 and push rod 96 thereby causing the buzzer to sound. The push rod 96 is electrically insulated from slide 108 which maintains the buzzer circuit in an open condition until slide pin 90 completes the circuit. The reset rod which is operatively connected to the push rod 96 is also electrically insulated from the push rod 96. The leaf spring 150 shown in FIG. 10 may be substituted for elements 36, 44, 40 and 38 as well as push rod 96 and related structure if desired.

An embodiment of the device is illustrated in FIGS. 7, 8 and 9 and is generally designated by the reference numeral 110. FIGS. 7, 8 and 9 are longitudinal sectional views of the device and illustrate the device in various positions. The numeral 112 designates a buoyant anchor means having a driving mass means 114 slidably mounted in a groove 116 formed in side portion 118. It should be understood that a second side portion corresponding to side portion 118 would be provided and spaced therefrom but which has not been shown for purposes of clarity. A flexible line 120 is secured to the rearward end of driving mass means 114 and would extend through a suitable opening formed in the ice layer 122. A pick means 124 is pivoted about pivot pin 126 and has its lower end connected to an accelerating force means such as a spring means 128. The other end of spring means 128 is connected to the forward end of driving mass means 114 and yieldably resists the rearward movement of driving mass means 114 with respect to the buoyant anchor means 112. An overdrive anchor disable means 130 is pivoted about a pivot pin 132 and has a pair of springs 134 and 136 positioned between its opposite ends and the lower end of anchor means 112 to yieldably resist the pivotal movement thereof. The rearward end of disable means 130 is provided with an arcuate stop means 138 which is normally in the slidable path of driving mass means 114 as illustrated in FIG. 7. As seen in FIG. 7, the forward end of anchor disable means 130 normally engages the lower end of pick means 124 to limit the clockwise pivotal movement of pick means 124 as viewed in FIG. 7. As seen in FIG. 9, stop means 138 is provided with a knob portion 141 which is adapted to maintain driving mass means 114 in the position seen therein at times.

Apparatus 10 may be used to extend a line beneath the ice for the placement or hauling of fishing nets or may be used to troll or still fish beneath the ice as illustrated in FIG. 1. Opening 14 is initially bored in the ice by any convenient means and the apparatus 10 is placed into the water beneath the ice through the opening. Apparatus 10 is pointed in the desired direction prior to any operation thereof. Initially, the pick 66 and pick 68 will engage the underside of the ice to anchor the apparatus with respect thereto. The operator then pulls the line 62 towards the opening 14 which causes pontoons 20 and 22 to be moved towards the opening with the anchor block means 18 remaining in its fixed position due to the engagement of the picks 66 and 68 with the ice. The movement of the frame means 16 towards the opening 14 causes spring means 56 to be extended and the line 62 is continued to be pulled until the slide pin 64 engages the rearward ends of U-shaped member 38. The operator will be able to determine when slide pin 64 engages the rearward ends of U-shaped member 38 due to the increased resistance which will be encountered and which will indicate to the operator that the spring means 56 is under full extension so that the apparatus is in a "cocked" condition. In the embodiment of FIG. 10, the operator will be able to determine when slide pin 90 engages the leaf spring 90 due to the increased resistance which will be encountered. Additionally, when the embodiment of FIG. 10 is employed with the apparatus 10, the engagement of the slide pin with the push rod will complete the buzzer circuit through the slide and the push rod thereby causing the buzzer to sound which aids in the audible detection of the location of the apparatus and also indicate that the apparatus is fully cocked. A sudden release of the piking rope 62 applies a spring force between the frame means 16 and the anchor block means 18 which accelerates the frame means 16 giving the moving body a specific momentum. The momentum varies with return velocity through the water since the mass is constant until stop means 34 contacts the slide pin 64. The shape and size of the frame means 16, including fixed attachments, is optimized in its relationship to the spring means 56, weight, buoyancy, viscosity of water and friction drag on the ice such that the stop means 34 will strike the slide pin 64 with the specific momentum required to maximize the forward travel beyond the anchor point. The dive fins 140 and 142 on the forward end of the frame means are such that the drag force through the water yields a downward force component which will extract picks 66 and 68 from their pockets in the ice at precisely the point of stop means 34 impact with slide pin 64. The dive component, controlled by forward velocity, then carries the complete unit through the water such that the picks 66 and 68 are free from the ice until the forward momentum is dissipated by water drag and ice friction drag. The buoyancy of the device will then cause the picks 66 and 68 to explode pockets in the underside of the ice to rigidly secure the anchor block means thereto for subsequent resetting the apparatus for the next cycle. This procedure is continued until the apparatus 10 has been propelled to its desired location. The signal means illustrated in FIG. 10 can be employed to locate the apparatus so that a second opening can be bored in the ice if a line is to be extended between the two openings in the ice for the placement or hauling of nets therebetween. If the apparatus is to be used for trolling or still fishing, the continuous line 76 would have been previously secured to the eye bolt 80 at the time the apparatus was placed beneath the ice. With the apparatus 10 in its desired location, it is simply necessary for the operator to rotate the reel 72 in one direction to cause the hook means 84 to be moved from the apparatus 10 to the opening 14. Obviously, the rotation of reel means 72 in an opposite direction will cause the hook means 84 to be moved from the opening 14 to the apparatus 10. Thus it can be seen that the hook means 84 can be positioned beneath the ice at any desired location so that the fisherman can effectively fish a larger area than possible by conventional methods.

When it is desired to return the apparatus 10 to the opening 14 for recovery thereof, it is simply necessary to pull on the piking rope 62 with a sufficient force to overcome the spring means 44 which will permit the slide pin 64 to pass from the channels in sides 28 and 28' to the slots 32 formed at one end thereof which will cause the upper surface of the picks 66 and 68 to be positioned below the top surface of the pontoons 20 and 22 so that the apparatus can be easily pulled to the opening 14 without the picks engaging the ice. Obviously, the slide pin 64 can be removed from the slots by simply pulling push rod 36 forwardly and by moving anchor block means 18 forwardly with respect to the pontoons so that the slide pin 64 can again engage the longitudinal channels formed in slides 28 and 28'. In the embodiment of FIG. 10, the slide pin 90 can be removed from the slot 106 by simply pulling push rod 96 forwardly and moving the anchor block means 18 forwardly with respect to the pontoons so that the slide pin 90 can again engage the longitudinal channels formed in the slides. The slide pin 90 will operatively engage the channels upon passing over and deflecting the leaf spring 90.

The alternate particular embodiment of the invention shown in FIGS. 7, 8 and 9 consists of the buoyant anchor means 112 which with its attachments is exceedingly less massive than the driving mass means 114, and supplies the specific buoyant force required to support the apparatus weight and to press the pick means 124 into the underside of the ice. Prior to applying force to the line means 120, the driving mass means 114 is held forward against the impact transmission means 144 and also maintains the lower end of the pick means 124 in engagement with the anchor disable means 130. As force is exerted on the line 120 towards the opening formed in the ice, driving mass means 114 is displaced rearwardly with respect to the buoyant anchor means 112 which is fixed to the ice by the pick means 124. The driving mass means 114 is displaced rearwardly with respect to the buoyant anchor means 112 until contact is sensed between the driving mass means 114 and the stop means 138 which indicates to the operator that the spring means 128 is fully extended. The sudden release of the flexible line 120 accelerates the driving mass means 114 forwardly to a specific momentum upon impact with the impact transmission means 144 which transfers a portion of the specific momentum to the buoyant anchor means 112 thereby carrying it beyond the original anchor point. When the driving mass means 114 strikes the impact transmission means 144 and drives the buoyant anchor means 112 forwardly, the pick means 124 pivots about pivot pin 126 in a counterclockwise direction thereby releasing it from engagement with the underside of the ice. When the forward momentum of the apparatus increases to a value less than that required to overcome the moment caused by the relaxed spring means 128, the pick means 124 will rotate back against the overdrive disable means 130 thereby resetting the apparatus for the next advancement cycle. Obviously, a fishing line similar to that illustrated in FIG. 1 may be attached to the buoyant anchor means if desired or the apparatus may be used to extend a line beneath the ice for placement or hauling of fishing nets as desired.

The apparatus is easily returned to the entrance opening in the ice by applying sufficient rearward force on the flexible line means 120 so that the driving mass means 114 is displaced rearwardly beyond the element 140 as illustrated in FIG. 9 which elevates the stop means 138 thereby causing the overdrive anchor disable means 130 to rotate about pivot pin 132 releasing the pick means 124 from its engagement therewith. The apparatus may then be pulled to the entrance opening and the apparatus can be manually reset for subsequent use.

The embodiment seen in FIG. 12 illustrates a modification of the anchor block means and is generally designated by the reference numeral 18'. The anchor block means 18' consists of a pair of spaced apart block members 46' (only one being shown) which are pivotally mounted on a slide pin 64' which is slidably mounted in channels formed in the spaced apart pontoons 20' (only one being shown). A rotational stop 170 is secured to the pontoons 20' and 21' and extends therebetween adjacent the bottom edge thereof intermediate the ends thereof. Inasmuch as the block members 46' and 48' are identical, only block member 46' will be described. Block member 46' includes a forward end 172, rearward end 174 and a tapered portion 176 extending forwardly from the rearward end 174. An angular support member 178 is secured to block members 46' and 48' and extend therebetween and has a pick means 180 extending therefrom. As seen in FIG. 12, the longitudinal axis of pick means 180 intersects the center of slide pin 64' when extended as illustrated in FIG. 12. The numeral 58' designates the rear attachment point to which the spring means similar to spring means 56 would be secured. The forward end of the spring means would be secured to the anchor block means 18' at 182. The broken line which extends between points 58' and 182 designates a first spring axis generally designated by the reference numeral 184. The spring axis 184 represents the axis of the spring means when the anchor block means 18' is in the position illustrated by solid lines in FIG. 12. The numeral 186 generally designates a second spring axis extending between points 58' and 182 which would be the spring axis when the anchor block means 18' has been rotated to the position illustrated by broken lines in FIG. 12. The numeral 34' refers to a stop means at the rearward end of the channels formed in the pontoon members and is adapted to be engaged by slide pin 64'.

In FIG. 12, the anchor block means 18 is illustrated by broken lines and in such position, the spring force holds the slide pin 64' firmly against the stop 34' causing the anchor block means 18' to rotate so that point 58', the lower point 182 and the center of slide pin 64' form a straight force line. When the buoyancy forces the pick means 180 against the underside of the ice 188, the rotational stop 170 supplies rigid restraint to the anchor block means 18' thereby causing the pick means 180 to penetrate the underside of the ice. As rearward force is applied to the appaartus 10', the anchor block means 18' rotates to the position illustrated by solid lines in FIG. 12 thereby embedding the pick means 180 deeper into the ice and exploding larger pockets. The position represented by solid lines in FIG. 12 represents the cocked position of the apparatus. On the forward stroke or when the rearward force is released, the impact of the stop means 34' with the slide pin 64' releases the force on the picks and the spring force moment rotates the pick means below the underside of the ice (the position represented by the broken lines in FIG. 12) eliminating the reduction in forward momentum required to disengage the pick means from the ice thereby yielding considerably greater forward displacement per stroke than is possible with the embodiment seen in FIG. 2 for example.

Thus it can be seen that a unique means has been provided for still fishing or trolling beneath a layer of ice at distances otherwise not possible. It can also be appreciated that an apparatus has been provided which may be used by commercial fishermen to extend lines beneath the ice for placement or hauling of fishing nets. The device may be propelled to any desired location and is easily recoverable therefrom as previously described. The apparatus is light weight and is preferably constructed of wood, aluminum or the like with the exception of the pick means, spring means, etc. to provide the device with the proper buoyancy. Thus it can be seen that the device accomplishes at least all of its stated objectives.

Some changes may be made in the construction and arrangement of my ice fishing apparatus without departing from the real spirit and purpose of my invention.

I claim:

1. In a device of the class described, comprising,
an elongated buoyant frame means having rearward and forward ends and a top and a bottom,
first means slidably and pivotally movably mounted on said frame means and being slidably movable from a first position intermediate the ends of said frame means to a second position adjacent the forward end thereof,
a first spring means extending between said frame means and said first means yieldably resisting the movement of said first means from said first position to said second position,
said first means also including ice engaging means adapted to engage the underside of an ice layer at times to limit the movement of said first means with respect to the ice layer, at times, the buoyancy of said frame means yieldably maintaining said ice engaging means in engagement with said ice layer at said times,
flexible first line means extending from the rearward end of said frame means through an opening in said ice layer so that said frame means can be moved rearwardly with respect to said first means towards said opening at times thereby causing said spring means to be extended, said ice engaging means engaging said ice layer to prevent the rearward movement of said first means as said spring means is being extended,
stop means on said frame means in the slidable path of said first means, said stop means adapted to operatively supply forward momentum to said first means upon the sudden release of the tension in said first flexible line means when said spring means is extended thereby causing said ice engaging means to be disengaged from said ice layer thereby causing said frame means and first means to be propelled in a direction away from said opening,
said frame means adapted to have a second flexible line means secured thereto which extends to said opening.

2. The device of claim 1 wherein said frame means has a diving fin portion at its forward end which extends downwardly and forwardly from the top thereof.

3. The device of claim 1 wherein said ice engaging means includes a pick means extending upwardly and rearwardly from the forward end of said first means.

4. The device of claim 3 wherein said ice engaging means is vertically movable with respect to said frame means and is movable between upper operative and lower inoperative positions and wherein the upper end of said pick means extends above the top of said frame means only when said ice engaging means is in an operative position.

5. The device of claim 1 wherein said frame means includes elongated, spaced apart pontoon members and wherein said first means is an anchor block means pivotally and slidably secured to and positioned between said pontoon members.

6. The device of claim 5 wherein said anchor block means has a slide pin extending from opposite sides thereof which is slidably and pivotally received by longitudinal channels formed in said pontoon members.

7. The device of claim 6 wherein said stop means is in the slidable path of said slide pin, said stop means striking said slide pin upon the sudden release of the tension in said first line thereby transmitting driving force to said anchor block means sufficient to disengage said ice engaging means.

8. The device of claim 6 wherein said ice engaging means includes a pick means extending upwardly from said anchor block means, said longitudinal channels each having a slot portion communicating with the forward end thereof which extend downwardly and rearwardly therefrom, said pick means being in an ice engaging position when said slide pin is received by said longitudinal channels, said pick means being in an inoperative position when said slide pin is received by said slot portions.

9. The device of claim 8 wherein a second spring means yieldably resists the movement of said slide pin from said channels to said slots.

10. The device of claim 9 wherein said second spring means is mounted on a reset rod means, said reset rod means being movable with respect to said slots whereby said slide pin may freely move from said slots to said channels.

11. The device of claim 6 wherein said slide pin is positioned adjacent the forward end of said anchor block means, said ice engaging means being positioned rearwardly of said slide pin.

12. The device of claim 11 wherein said ice engaging means is comprised of an elongated pick means, the projected longitudinal axis of said pick means intersecting the center of said slide pin.

13. The device of claim 12 wherein said anchor block means is pivotally movable from a first position to a second position, the projected axis of spring means intersecting the center of said slide pin when said anchor block means is in its first position.

14. The device of claim 1 wherein said first means is comprised of an anchor block means having rearward and forward ends, said anchor block means being slidably and pivotally secured to said frame means, said ice engaging means comprised of pick means extending upwardly from the forward end of said anchor block means, said first spring means causing said anchor block means to pivot with respect to said frame means so that the rearward end of said anchor block means engages the ice when said pick means is in engagement with the ice.

15. The device of claim 1 wherein said second flexible line is a continuous line movably connected to the rearward end of said frame means, said continuous line being operatively secured to a reel means mounted on a fishing rod, said continuous line having a hook means secured thereto between said opening and said frame means, said reel means being rotatable in one direction to move said hook means from said opening to said frame means and being rotatable in an opposite direction to move said hook means from said frame means to said opening.

16. In a device of the class described,
a buoyant anchor means having rearward and forward ends,
a driving mass means longitudinally movably mounted on said anchor means,
a flexible line secured to said driving mass means,
an ice engaging means operatively pivotally connected to said anchor means and normally extending upwardly therefrom to engage said ice, the buoyancy of said anchor means yieldably maintaining said ice engaging means in engagement with said ice at times,
a spring means connecting said anchor means and said driving mass means and yieldably resisting the rearward movement of said driving mass means with respect to said anchor means, said spring means being extended upon said driving mass means being moved rearwardly with respect to said anchor means by said line means,
said spring means causing said driving mass means to accelerate forwardly with respect to said anchor means upon the sudden release of the tension on said line when said spring means is in an extended position,
said anchor means having an impact transmission means thereon which is operatively engaged by said driving mass means when said driving mass means is accelerated forwardly with respect to said anchor means,
the forward driving momentum of said driving mass means engaging said impact transmission means causing said anchor means to be propelled away from said opening.

17. The device of claim 16 wherein said ice engaging means is comprised of a pick means operatively pivotally secured to said anchor means and extending upwardly and rearwardly therefrom, said spring means being operatively connected to said pick means to normally maintain said pick means in an ice engaging position.

18. The device of claim 17 wherein a stop means is pivotally secured to said anchor means and normally yieldably limits the pivotal movement of said pick means in one direction, said stop means being engaged and pivotally moved by said driving mass means when said driving mass means is moved to its extreme rearward position with respect to said anchor means.

19. The device of claim 1 wherein a signal means is mounted on the said device which is selectively activated at times so that the location of the device may be ascertained.

References Cited
UNITED STATES PATENTS

| | | | |
|---|---|---|---|
| 2,904,919 | 9/1959 | Long | 43—4 |
| 3,001,313 | 9/1961 | Long | 43—4 |

WARNER H. CAMP, Primary Examiner